United States Patent [19]
Murphy et al.

[11] Patent Number: 5,186,199
[45] Date of Patent: Feb. 16, 1993

[54] CONDUIT STOPPER

[76] Inventors: Kevin P. Murphy, 4 Carlisle Dr., Oak Brook; Garland Y. Smith, 605 Lakeside Dr., Hinsdale, both of Ill. 60521

[21] Appl. No.: 790,655

[22] Filed: Nov. 8, 1991

[51] Int. Cl.⁵ ..................... F16K 43/00; F16L 55/132
[52] U.S. Cl. ...................................... 137/15; 137/318; 138/89; 138/94; 138/97
[58] Field of Search .................. 137/15, 315, 318; 138/89, 94, 94.3, 97

[56] References Cited
U.S. PATENT DOCUMENTS

| | | | |
|---|---|---|---|
| 2,171,576 | 9/1939 | Larry et al. | 137/15 |
| 2,171,937 | 9/1939 | Larry et al. | 138/94 |
| 2,171,942 | 9/1939 | Mueller | 137/318 |
| 2,237,476 | 4/1941 | Cline | 137/318 |
| 2,272,734 | 2/1942 | Witt | 138/94 |
| 2,510,513 | 6/1950 | Mueller et al. | 137/15 |
| 2,756,486 | 7/1956 | Smith | 137/318 |
| 2,763,282 | 9/1956 | Reedy et al. | 137/318 |
| 2,968,465 | 1/1961 | Flick et al. | 251/63.6 |
| 3,115,163 | 12/1963 | Van Epps et al. | 138/94 |
| 3,120,246 | 2/1964 | Alter | 138/94 |
| 4,355,656 | 10/1982 | Smith | 137/318 |
| 5,052,431 | 10/1991 | Jiles | 137/318 |

OTHER PUBLICATIONS

*Bulletin J-3 Line Stopping Unit No. 3*, Mueller Co., May 1977 pp. J-3-2 and J-3-4.

Primary Examiner—George L. Walton
Attorney, Agent, or Firm—Anthony S. Zummer

[57] ABSTRACT

A conduit stopper is used for interrupting the flow of fluid through an elongated conduit. The conduit stopper has a nozzle sealingly mounted on the elongated conduit. The conduit has an aperture communicating with the nozzle. A deformable sealing element having opposed substantially flat sides is movably mounted in the nozzle and is engageable with the interior of the conduit to interrupt the flow of fluid through the conduit. A carrier is sealingly connected to the sealing element. An actuator is connected to the carrier for moving the carrier into sealing communication with the nozzle and then to deform the sealing element into sealing engagement with the interior of the conduit while the carrier and the nozzle are in sealing communication.

12 Claims, 10 Drawing Sheets

CONDUIT STOPPER

BACKGROUND OF THE INVENTION

Fluids, whether they be gaseous or liquid, are typically distributed through a series of conduits which make up a conduit system. In many instances, it is desirable to make a repair or a replacement in a portion of a conduit system. One method of making a repair is to shut down the entire system so that a portion may be repaired. This method is not desirable in many instances, whether it be an industrial system as in an oil refinery, or a commercial system, as in a municipal water system or a municipal gas distribution system.

There are a variety of means which allow repair, replacement, relocation or an installation of new parts into a pressurized conduit or piping system with no loss of service to the entire system, and minimal draining or bleeding of the fluid contents in a particular conduit. Conduit stopping or plugging is accomplished in virtually every type of piping material and in conduits conveying virtually every type of fluid.

Most mechanical stopping or blocking procedures require that a lateral access opening be made in the conduit to permit a stopper or block to be inserted into the conduit. The usual procedure to cut the access hole into the conduit is variously called hot tapping, wet tapping, pressure tapping, side tapping, and a variety of other terms depending upon the given industry and the locale.

Hot tapping involves mounting a nozzle onto the conduit with a pressure tight fit between the nozzle and the conduit. A gate-type valve is mounted on the nozzle and a pressure tight cutting machine is mounted on the valve. The valve is opened and a cutter from the cutting machine is advanced through the valve to engage the conduit to cut an access opening into the conduit. After the access opening is cut, the cutter is retracted outward through the valve. The valve is closed. Then, the cutting machine is removed without loss of pressure or flow in the conduit.

The size of the access opening in the conduit is determined by the design and size of the particular plug or stopper. In most instances, stoppers require an access hole having a diameter which is 95% or more of the interior diameter of the conduit. Certain stoppers require access openings which are as small as 70% or 80% of the size of the interior diameter of the conduit. It is desirable to have a smaller access opening because the structural integrity of the tapped conduit is inversely proportionate to the size of the access opening. In addition, various material and tooling costs are reduced when the size of the access opening is decreased.

The utilization of access holes for stopper devices which holes are less than 95% of the diameter of the conduit is disclosed in three U.S. Pat. Nos., namely; 3,120,246, issued Feb. 4, 1964, entitled, "Conduit Stopper", the inventor being Fritz Alter; 3,115,163, issued Dec. 24, 1963, entitled, "Means For Stopping The Flow Of Fluid In A Conduit", the inventors being, Kenneth S. Van Epps and Walter E. Magnus; and 2,272,734, issued Feb. 10, 1942, entitled, "Means For Stopping Flow Of Fluid In Conduits", the inventor being Irwin H. Witt. Each of the three patents teaches a flat generally rectangular resilient sealing element. Witt discloses a sealing element having an arcuate bottom portion for engagement with the interior of the conduit. Alter and Van Epps, each discloses a resilient carrier having a vertical slot to receive the flat sealing element and a retainer screw threaded to the carrier. In each of the three patents, the carrier is inserted into the pressurized conduit utilizing a hollow jack screw. When the carrier is positioned inside the conduit, a second jack screw inside the first jack screw advances the sealing element against the conduit forcing it to deform outward from the carrier into sealing contact with the inner wall of the pipe. The use of the double jack screw greatly increases manufacturing costs of the stopper because of the plurality of parts required and the precise tolerances needed for proper operation. In addition, more seals are needed to prevent leakage from the pressurized conduit through the machine and into the environment. The spatial limitations necessitate that certain parts are smaller, and thereby more fragile than would be desired in a machine for use in the field by the mechanical trades which perform the piping repair functions. Each of the three disclosures teaches a different method of sealing the outside of the carrier to the bore or nozzle. None utilizes a positive sealing system that compresses a resilient gasket against a metal seat.

In some instances, it is desirable to isolate a section of conduit but still keep the entire system operative. An accepted means is taught by the above identified U.S. Pat. No. 2,272,734, to Witt and U.S. Pat. No. 3,115,163, to Van Epps et al. Each of these patents teaches a similar arrangement. Two conduit stoppers are mounted on the conduit. Two additional nozzles and valves are mounted onto the conduit and then hot tapped to provide a connection into the conduit. A bypass pipe is then installed between the two valves, allowing flow to the system downstream of the stopper installation. Both Witt and Van Epps do not teach a bypass conduit that can be connected to their stopper apparatus. Therefore, the prior art requires the two extra hot taps be effected to provide the bypass.

The Mueller Co. of Decatur, Ill. discloses a bypass rubber stopper for use in a stopper for diversion of flow of a fluid. This disclosure is contained in pages J-3-2 and J-3-4 of Bulletin J-3 Line Stopping Unit No. 3 published May, 1977.

SUMMARY OF THE INVENTION

The present invention is an improvement of a conduit stopper for interrupting the flow of fluid through an elongated conduit. A nozzle is sealingly mounted on the elongated conduit. The conduit has an aperture in its sidewall communicating with the nozzle. The conduit stopper includes a deformable sealing element having opposed substantially flat surfaces and being generally rectangular in shape. When the sealing element is forced into sealing engagement with the interior of the conduit, it is deformed to interrupt the flow of fluid through the conduit. A carrier is sealingly connected to the sealing element. An actuator is connected to the carrier through a force limiting resilient member to hold the carrier in sealing communication with the nozzle and serially applying a force to the sealing element to deform the sealing element into sealing engagement with the interior of the conduit. The force limiting resilient member is positioned between the carrier and the nozzle to limit the amount of force applied to a seal between that nozzle and that carrier.

DESCRIPTION OF THE PREFERRED EMBODIMENT

Figure 1:
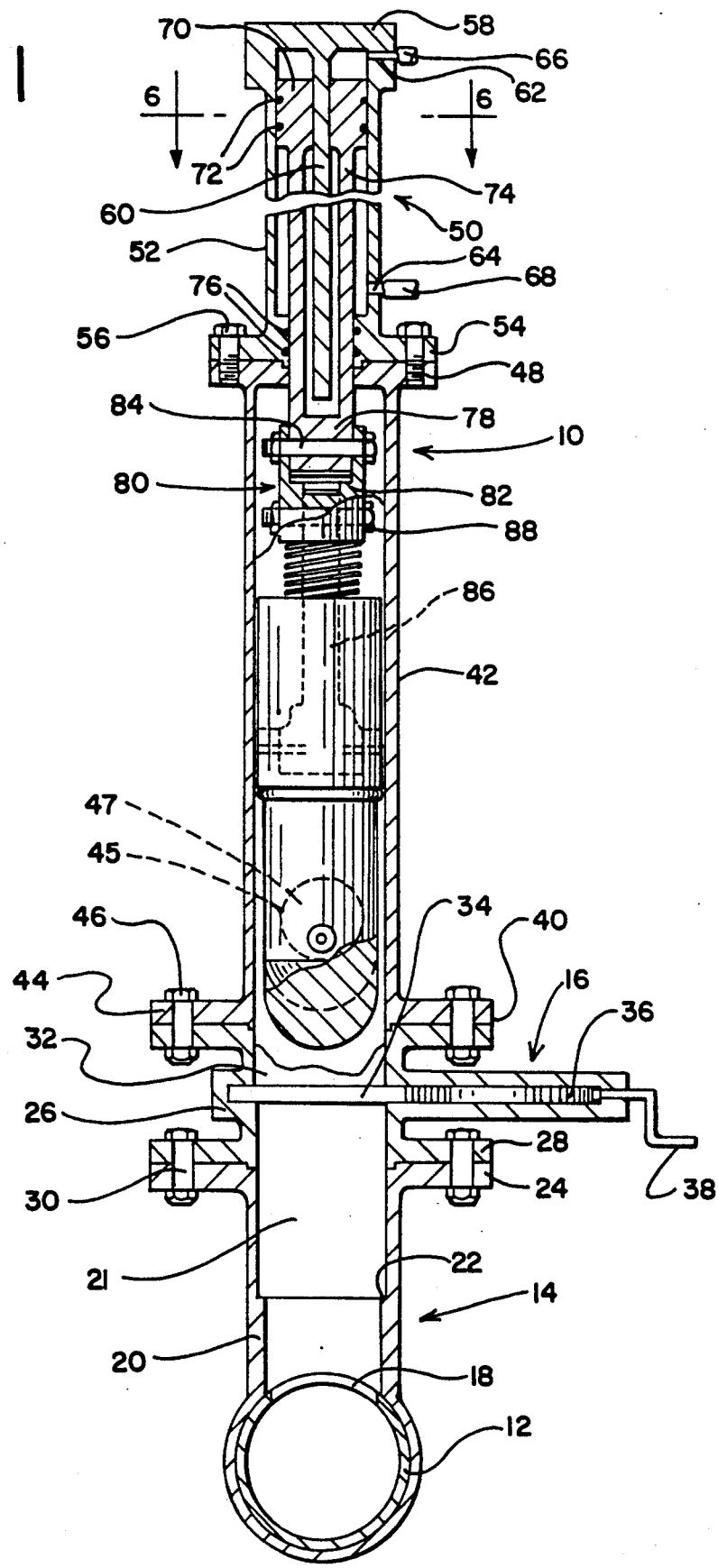
FIG. 1 is a cross sectional view through a conduit, a nozzle, a gate valve and a conduit stopper which conduit stopper is a specific embodiment of the herein disclosed invention.
Figure 2:
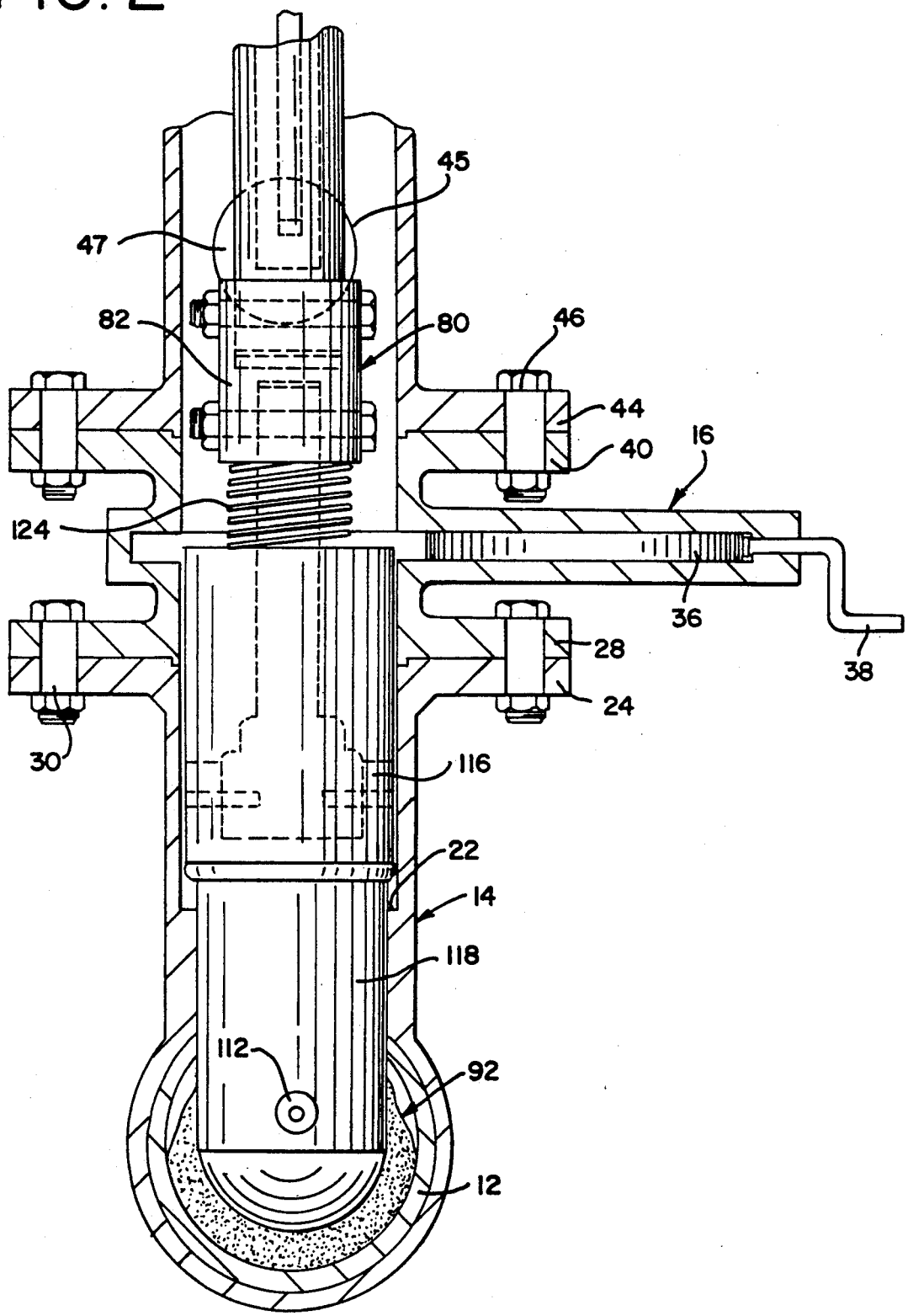
FIG. 2 is a cross sectional view showing a sealing element of FIG. 1 moved into position into the conduit and before a seal mounted on a carrier of the conduit stopper engages a shoulder of the nozzle.
Figure 3:
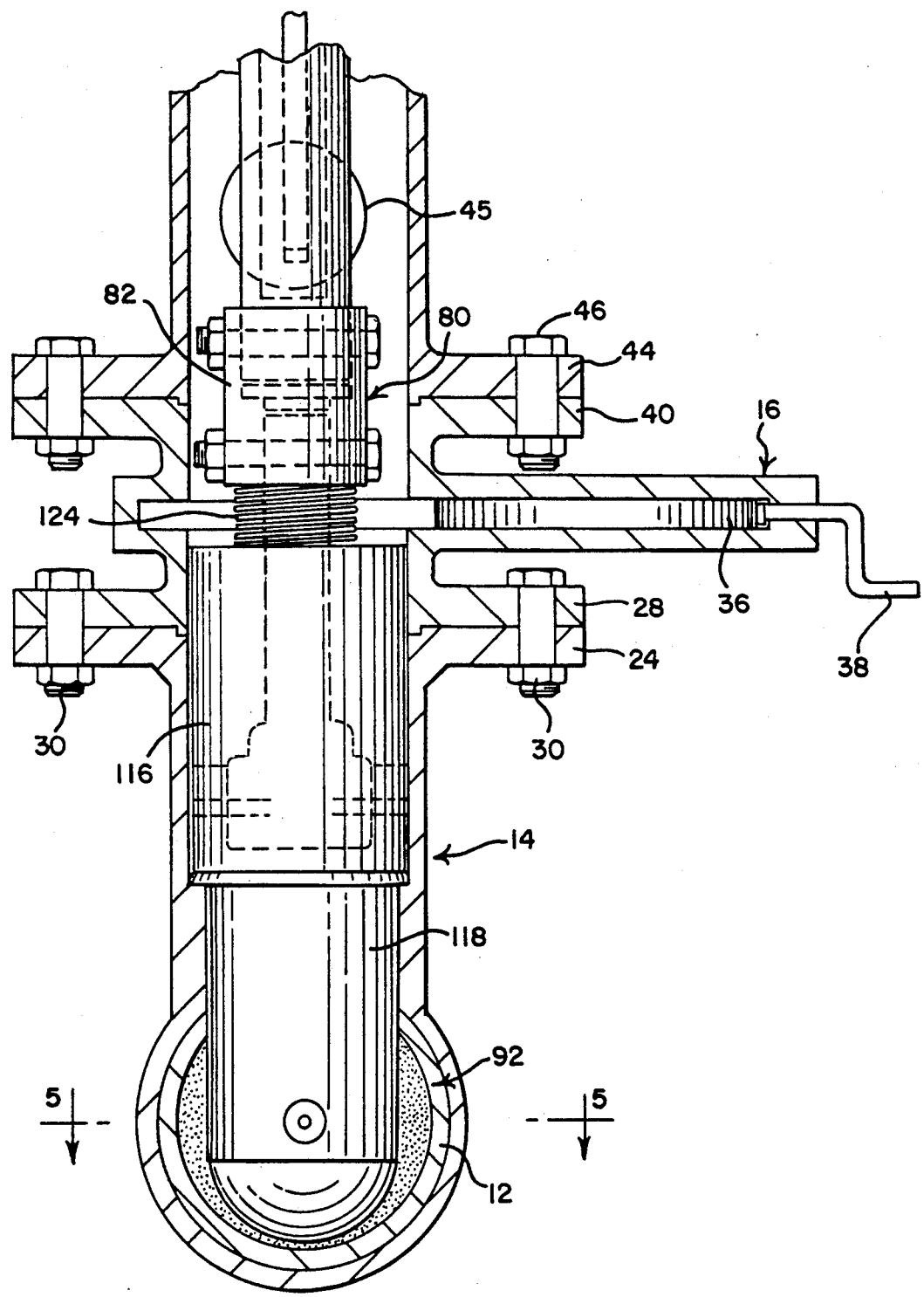
FIG. 3 is similar to FIG. 2 but after the seal between the carrier and the nozzle is in position and the sealing element is in complete sealing engagement with the interior of the conduit.

Referring now to the drawings, and especially to FIG. 1, a conduit stopper embodying the herein disclosed invention is shown in cross section and is generally indicated by numeral 10. A conventional elongated conduit 12 is shown in cross section with a conventional saddle 14 sealingly mounted on a straight portion of the conduit. A conventional gate valve 16 is mounted on saddle 14. The conduit stopper is sealingly mounted on gate valve 16.

Conduit 12 is a conventional conduit or pipe which has a circular cross section. An access opening or aperture 18 is cut into the conduit 12. Access opening 18 which is generally circular has a diameter which is considerably less than the interior diameter of conduit 12 thereby providing greater structural integrity in the conduit at the location of the access opening than if the opening were substantially greater in diameter.

Saddle 14 is sealingly mounted on the conduit 12. The saddle has a nozzle 20 formed integral therewith. The nozzle has a circular stepped opening 21 extending therethrough which is aligned with access opening 1B. The nozzle has an annular shoulder 22 in its interior surface which is formed by the enlargement of the nozzle opening away from the conduit. A nozzle flange 24 is formed integral with the outer periphery of the free end of nozzle 20. When the pipe size is relatively smaller, threaded connections may be used rather than the flange connections which are described hereinafter.

Gate valve 16 is conventional and includes a gate valve body 26 which has a gate valve flange 28 formed integral therewith. Gate valve flange 28 is sealingly connected to nozzle flange 24 and is securely held thereto by a plurality of conventional fasteners 30. The gate valve body includes an axial opening 32 and is aligned with the interior of nozzle 20. A gate slot 34 is formed in the body and a conventional valve gate 36 is movably mounted in slot 34. A valve operating crank 38 is mounted in the body and is connected to the valve gate to move the valve gate into and out of opening 32 to control the flow of fluid through the gate valve. The valve body includes an upper flange 40 which is formed integral therewith.

The conduit stopper includes a cylindrical stopper housing 42. The housing 42 has formed integral therewith a valve flange 44 which is sealingly connected to flange 40 of the valve. A plurality of conventional fasteners 46 hold the flanges together in a sealing relationship. A bypass port 45 is found in the side of the housing, and a removable plug 47 is sealingly mounted in the port to close to the port. Housing 42 has an actuator flange 48 formed integral with the end of the housing opposite the end having flange 44.

Figure 6:
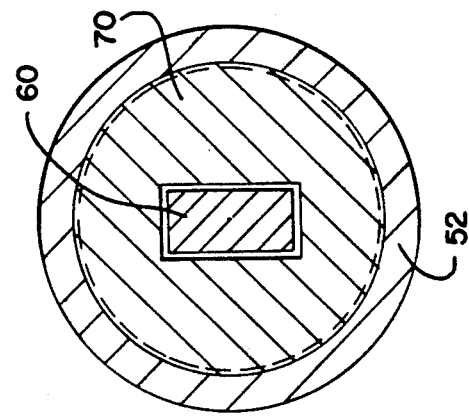
FIG. 6 is an enlarged cross sectional view taken on Line 6—6 of FIG. 1.

An actuator 50 is sealingly connected to housing 42. Actuator 50 is a hydraulic cylinder, in this instance, though a pneumatic cylinder or a jack screw arrangement may be used instead. The hydraulic cylinder is conventional and has an axis of operation which is perpendicular to the length of the conduit. The actuator includes a cylinder 52 which has a housing flange 54 formed integral therewith and in sealing engagement with flange 48 of the housing. A plurality of conventional fasteners 56 hold flanges 48 and 54 in sealing engagement with each other. Cylinder 52 has an enlarged head 58 formed integral therewith. An elongated guide rod 60 is formed integral with the head and extends into the cylinder. The guide rod 60 has a rectangular cross section, as may be best seen in FIG. 6. An extension port 62 is formed in head 58 and retraction port 64 is formed in the sidewall of cylinder 52. A conventional hydraulic line 66 is connected to port 62 and a second conventional hydraulic line 68 is connected to port 64. Hydraulic lines 66 and 68 are connected to a conventional and well known source of hydraulic fluid which is not shown herein. A piston 70 is mounted within cylinder 52. A pair of seals 72 is mounted on the outer surface of the piston in sealing engagement with the interior of cylinder 52. A hollow piston rod 74 is formed integral with piston 72. A pair of packing seals 76 is mounted in the cylinder in engagement with rod 74 to provide a seal therebetween. The rod has a piston connector end 78 formed integral with its free end.

Figure 4:
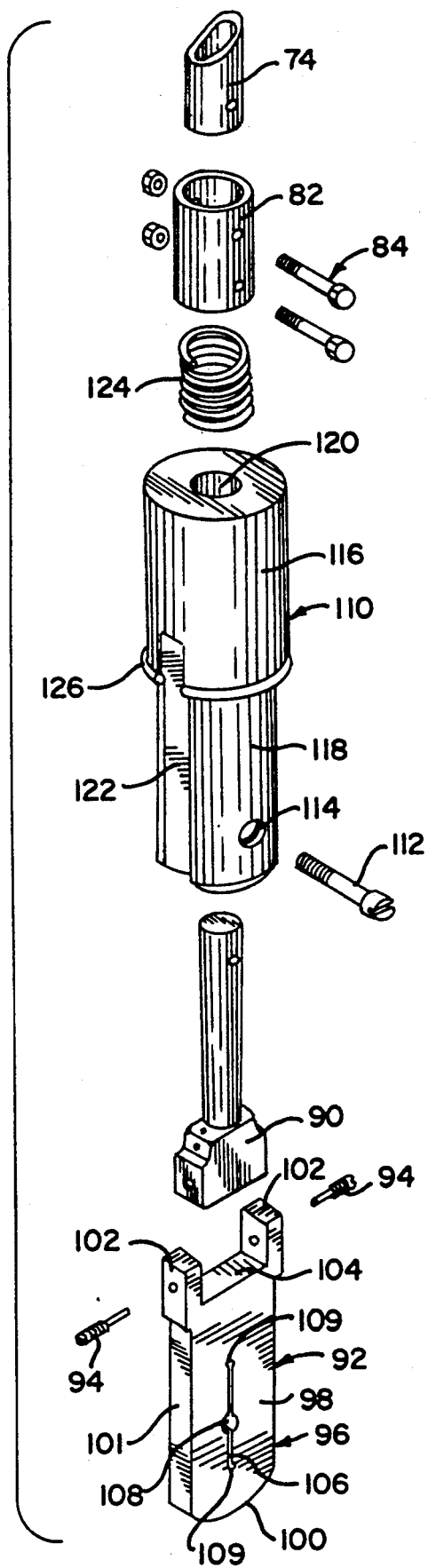
FIG. 4 is an enlarged exploded view of a portion of the conduit stopper showing the interrelationship of the sealing element and the carrier.

An actuator assembly 80 is connected to piston end 78. The actuator assembly, which may be best seen in FIG. 4, includes an annular actuator collar 82 which is connected to piston end 78 by an actuator screw and nut assembly 84. A compression bar 86 is connected to the actuator collar by a bar screw and nut assembly 88. The compression bar 86, as may be best seen in FIG. 4, includes a bar head 90. A rubber-like deformable sealing element 92 is connected to bar head 90 by a pair of threaded pins 94.

The sealing element is made of a rubber-like deformable material which is capable of being deformed into sealing contact with the interior of conduit 12, carrier 110, and seal 126. The material of the sealing element may be varied depending upon the fluid which is carried in the conduit.

The sealing element includes a body 96 which has a pair of opposed substantially flat sides 98 and an arcuate lower edge 100. Opposed arcuate edges 101 form the narrow sides of the sealing body. A pair of ears 102 is formed integral with the body to receive the bar head 90 therebetween and receive the threaded pins 94 to secure the bar head to the sealing element. The sealing element includes a flat surface 104 which receives the end of head 90. The sealing element body 96 includes a vertical slit 106 with a retaining fastener opening 108 extending through the body in the center of the slit. A circular opening 10 is found in the body at each end of the slit to prevent tearing of the body when the sealing element is compressed.

A carrier 110 is movably connected to sealing element 92 by a sealing element retaining screw 112 which is fixed in a screw aperture 114 in the carrier and extends through aperture 108 of the sealing element. The carrier includes a crown 116 with a reduced split neck 118 which has the screw aperture 114 contained therein. The crown includes a guide orifice 120 which slidably receives the compression bar 86. The carrier includes carrier cavity 122 which extends through the reduced split neck 118 and into crown 116 to communicate with orifice 120. The sealing element is positioned in carrier cavity 122, and the arcuate edges 101 form a continuation of the outer surface of neck 118. An overtravel spring 124 slidably receives compression bar 86 and is positioned between the actuator collar 82 and the top of crown 116 to provide a resilient element between the parts. A segmented ring resilient shoulder seal 126 is mounted on carrier 110 at the lower edge of crown 116 for sealing engagement with nozzle shoulder 22.

Conduit stopper 10 utilizes the single actuator which serially seals the space between the carrier and the nozzle and then seals the conduit to prevent fluid to flow through the conduit.

Access aperture 18 is formed in a conventional manner by the hot tapping process and the conduit stopper is mounted onto the gate valve. Once the conduit stopper is in position and valve gate 36 is moved to its open position, the conduit stopper may be put into operation to stop the flow of fluid through conduit 12. Hydraulic fluid under pressure is supplied to port 62 from a conventional source of hydraulic fluid. The fluid, as is convention, pushes piston 70 downward. The piston is restrained from rotation by guide rod 60.

Downward movement of the piston forces the actuator rod to move downward and also carry with it actuator collar 82. Downward movement of collar 82 causes carrier 110 to move downward and thereby move sealing element 92 downward into conduit 12 through access opening 18. The actuator rod pushes down onto surface 104 of sealing element 92 to push the sealing element into the conduit. The same continuous downward movement in one direction of the piston moves the carrier and the sealing element downward until shoulder seal 126 engages nozzle shoulder 22. The carrier no longer moves downward when seal 126 seats on the nozzle shoulder 22. Further continuous downward movement of the piston does not cause the carrier 110 to move further into the nozzle. The amount of force between the carrier seal and the nozzle shoulder is limited by the spring rate of spring 124 which provides a means for limiting the force between the carrier and the nozzle. By the selection of spring 124 having the proper spring rate, a good seal may be effected between the carrier and the nozzle where seal 126 is positioned. The likelihood of seal 126 being extruded out of a sealing contact position between the carrier and the nozzle is eliminated so that there is maintained a good and effective seal between the carrier and the nozzle when the piston continues downward movement.

Figure 5:
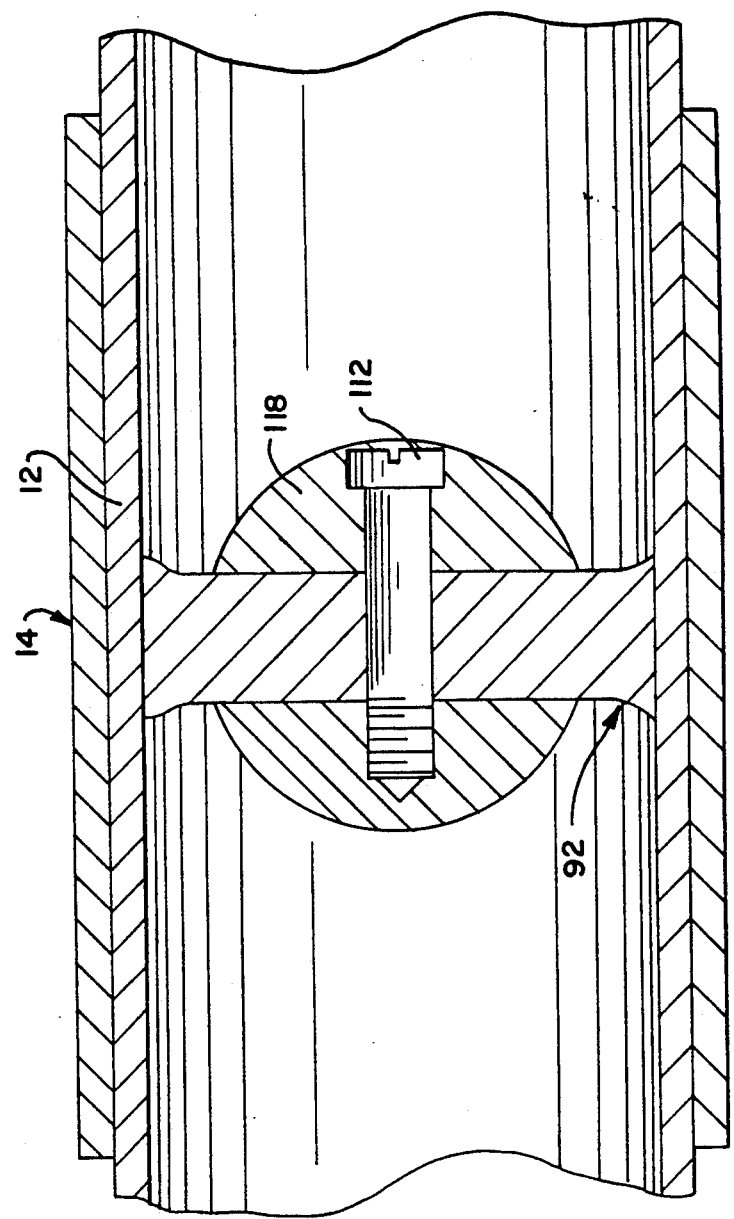
FIG. 5 is an enlarged cross sectional view taken on Line 5—5 of FIG. 3 showing a portion of the sealing element in sealing engagement with the interior of the conduit.

Continued downward movement of the piston with the actuator rod toward the conduit continues to compress sealing element 92 as is well known in the prior art. Slit 106 allows sealing element 92 to spread out radially and enter into sealing engagement with the interior of the conduit as shown in FIG. 5. In addition, the compression of the sealing element causes the sealing element to deform and engage the interior of the carrier and to engage the interior of the nozzle to effect a seal between the sealing element and the nozzle. In addition, the deformation of the sealing element makes sealing contact with the exposed ends of segmented seal 126. Thus, there is an effective continuous annular seal at the nozzle shoulder. Part of the seal is effected by the segmented seal 126 and the portions where there is no seal 126 is sealed by sealing element 92. The force applied to the sealing element causes the sealing element to expand where it engages the conduit as shown in FIG. 5, and thereby effect an improved seal to prevent the flow of fluid in the conduit to pass the sealing element and seal 126.

From the foregoing description, it may be readily appreciated how a continuous movement in one direction by the actuator effects sealing between the carrier and the nozzle and closing off of the conduit. Segmented seal 126 is protected from extrusion by the spring 104 while the force applied to the sealing element may be substantially increased to make certain that sealing element 92 is sufficiently deformed to provide a seal and thereby prevent the flow of fluid through conduit 12.

In those instances where it is necessary to provide a fluid flow around a section of conduit 12, the present arrangement may be utilized using a modified carrier. The modified form of the carrier is shown in FIGS. 8, 9, 10 and 11. All of the remaining parts of the conduit stopper are the same and the same numbers are applied to those parts.

Figure 8:
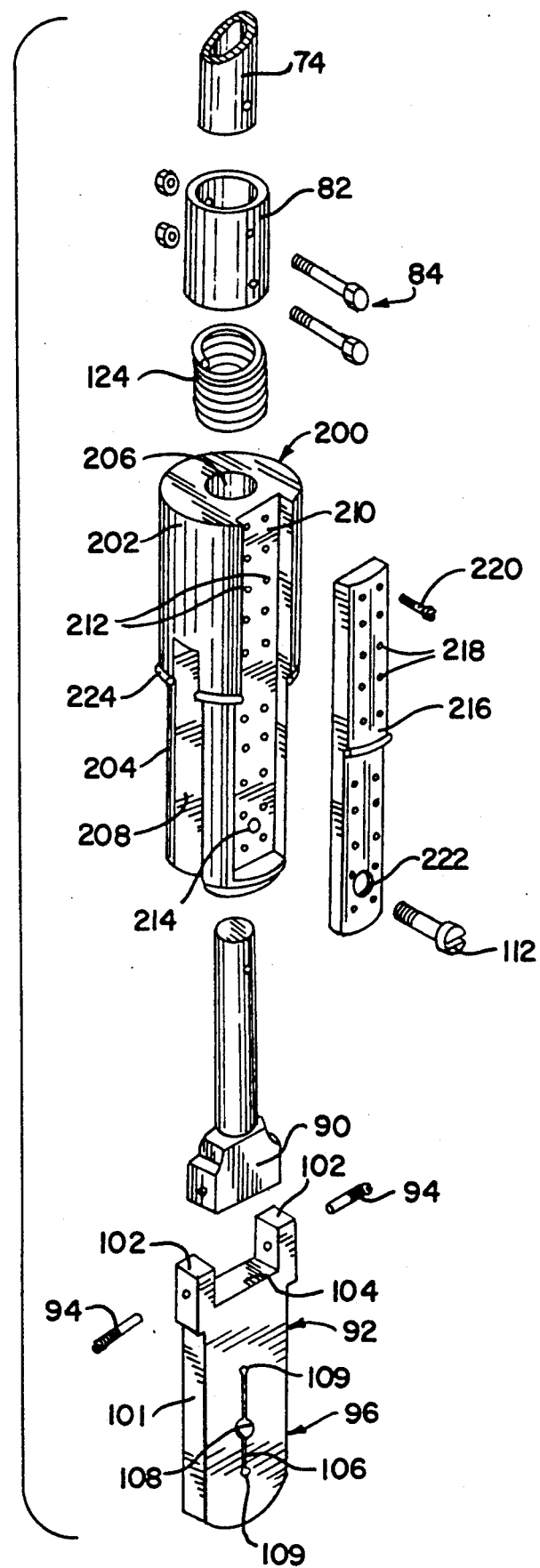
FIG. 8 is an exploded view similar to FIG. 4 but showing a construction wherein the carrier includes a bypass channel and a bypass channel dam is provided for mounting in the bypass channel.

Referring now to FIG. 8, a carrier 200 includes a crown 202 with a neck 204 formed integral with the crown. The crown has a guide orifice 206 for receipt of compression bar 86. A carrier cavity 208 extends through neck 204 and into crown 202 to communicate with orifice 206.

Carrier 200 includes a bypass channel 210 which extends from the top of crown 202 into neck 204 and ends adjacent to the bottom of the neck. The carrier has a plurality of identical screw apertures 212 and a retaining screw aperture 214. A bypass channel dam 216 removably mateably fits in bypass channel 210. The bypass channel dam has a plurality of fastener openings 218 which are alignable with screw apertures 212. A plurality of dam fasteners 220 is removably mounted in the bypass channel dam to secure the bypass channel dam to the carrier and thereby selectively close the bypass channel. The bypass channel dam includes a retaining fastener opening 222 which is aligned with retraining screw aperture 214 when the bypass channel dam is in place.

Figure 9:
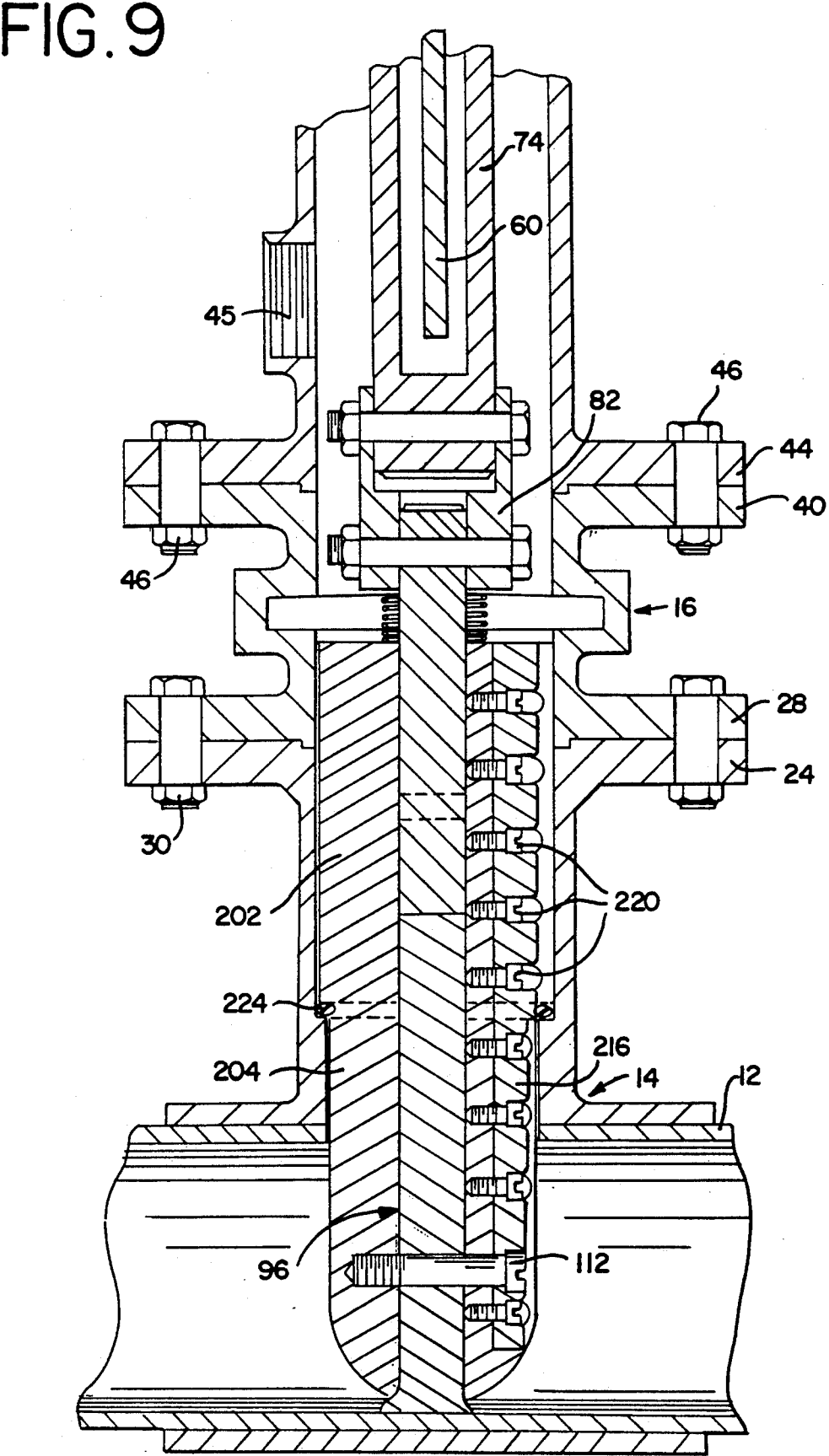
FIG. 9 is a cross sectional view showing a carrier having a bypass channel dam mounted in the bypass channel.
Figure 10:
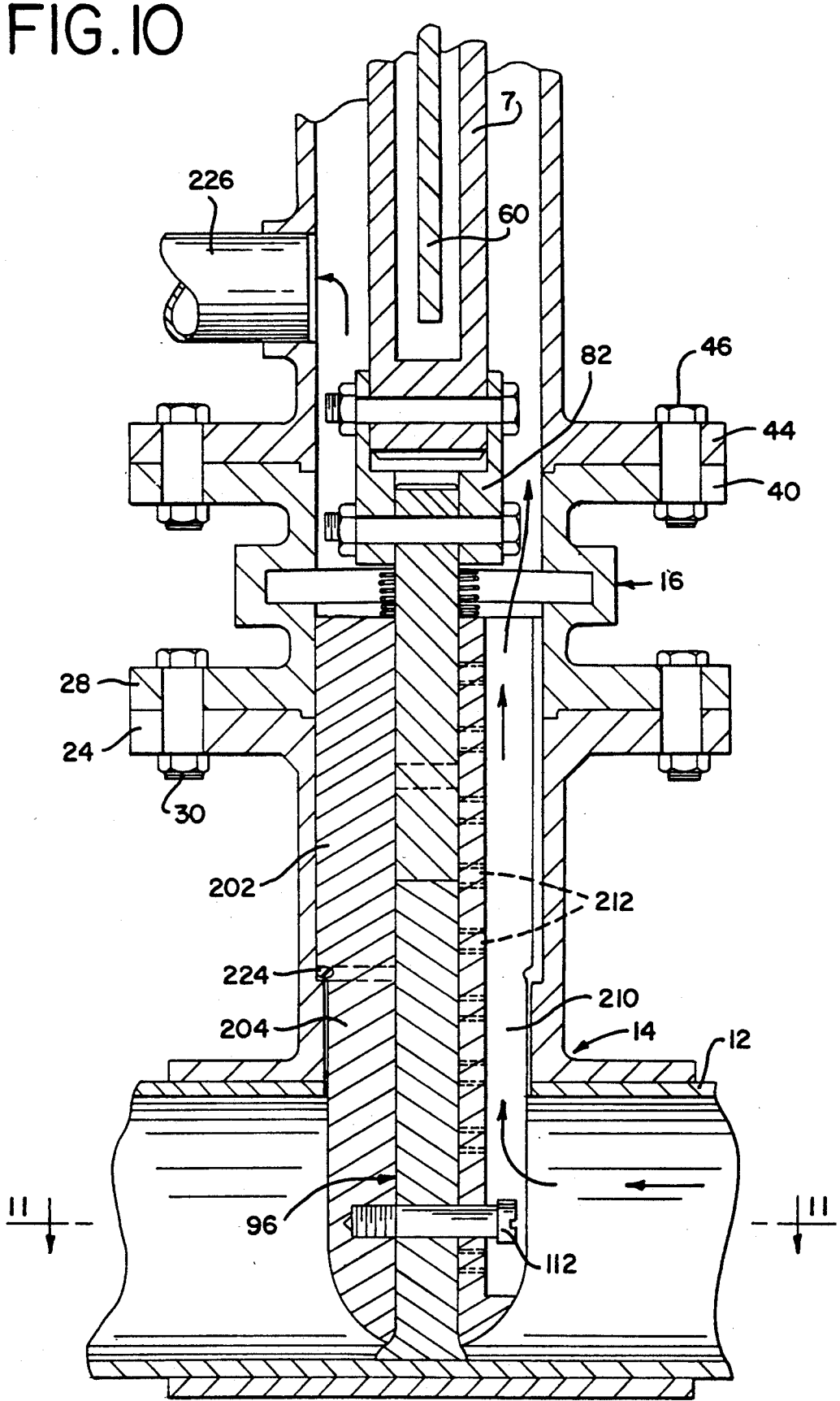
FIG. 10 is a cross sectional view similar to FIG. 9 but with a bypass channel dam removed to allow fluid to flow from the conduit into the conduit stopper.
Figure 11:
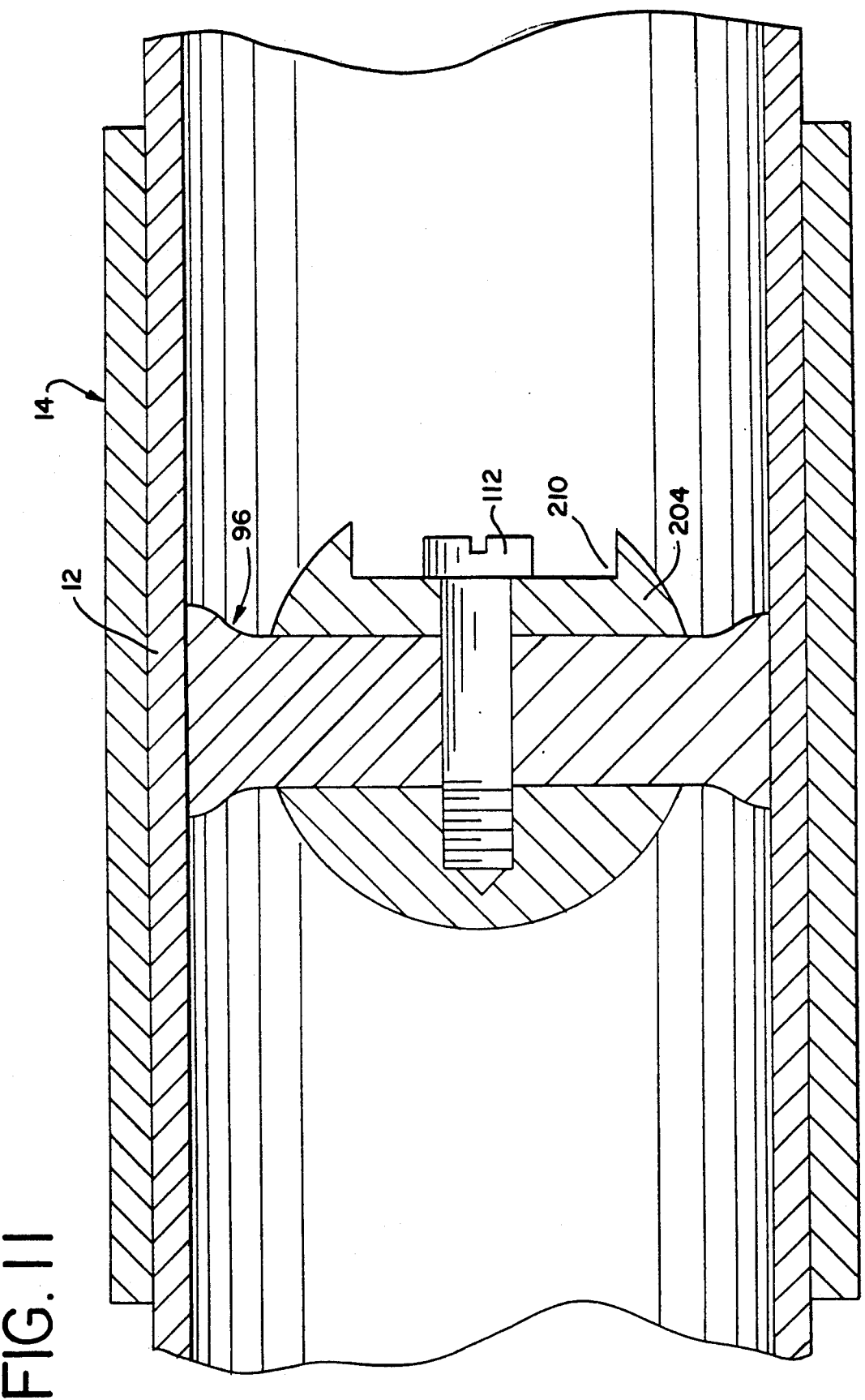
FIG. 11 is an enlarged cross sectional view taken on Line 11—11 of FIG. 10.

When the bypass channel dam is in place as shown in FIG. 9, a segmented seal 224 is mounted on the carrier and on the bypass channel dam. With the bypass channel dam in place and the seal 224 in place, the conduit stopper operates in the same manner as the conduit stopper described above.

Figure 7:
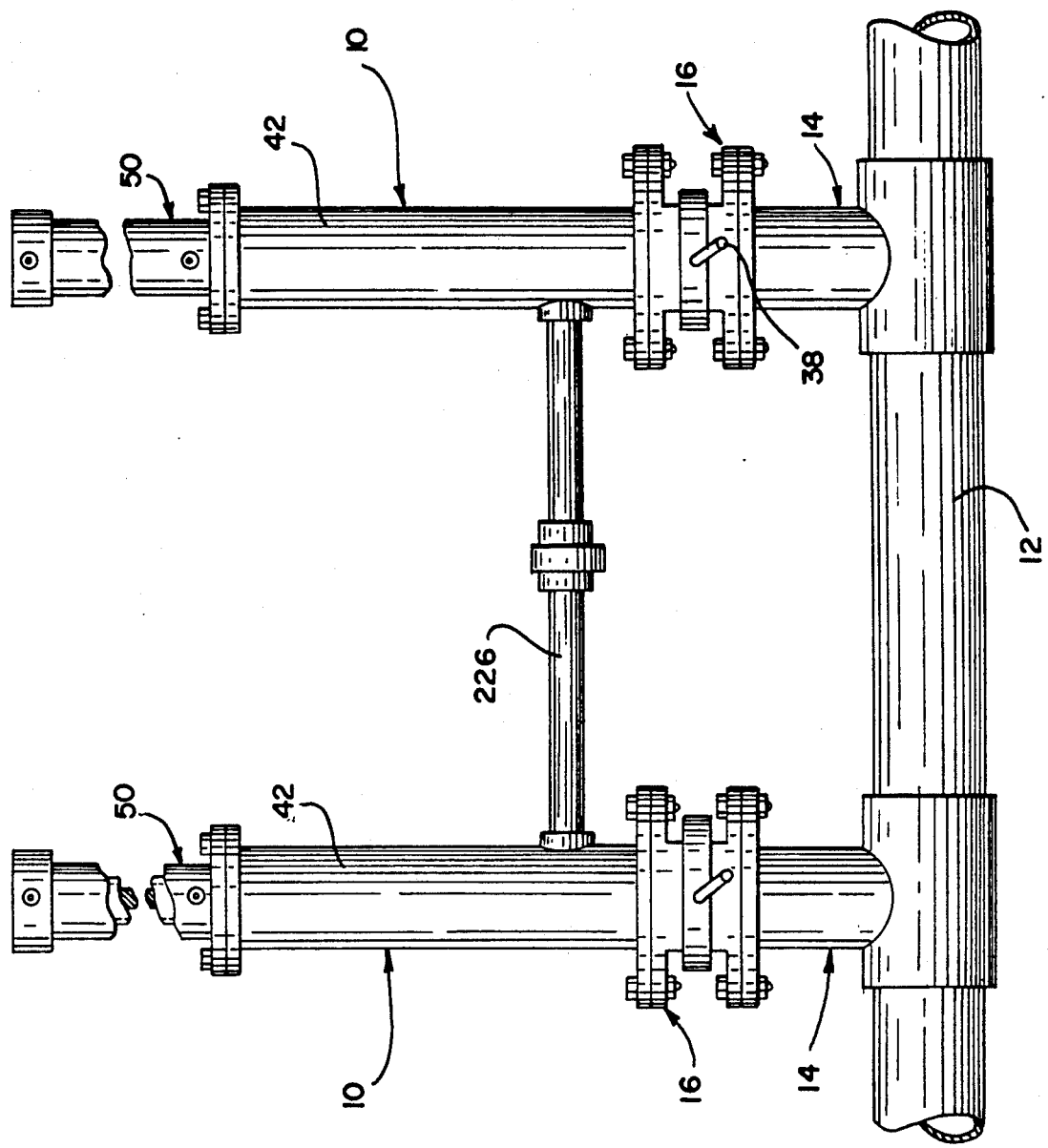
FIG. 7 is a side elevational view of a conduit having a pair of conduit stopper assemblies mounted on the conduit wherein the conduit stopper assemblies are interconnected by a pipe to allow fluid to flow around a section of the conduit which may be depressurized.

The bypass channel dam may be readily removed even in the field simply by removing the dam fasteners. When the bypass channel dam is removed, the conduit stopper may be used in a system to provide a bypass around a portion of a conduit such as that shown in FIG. 7. It is only necessary to provide two conduit stoppers wherein the carriers have bypass channels as described above with the bypass channel dams removed. Stoppers 10 having bypass channels opened are mounted on conduit 12 as shown and described above. Plugs 47 of housings 42 are removed and the housings are interconnected by conventional bypass piping 226 positioned in ports 45. When the conduit stoppers are interconnected, the sealing element of each conduit stopper is moved down with the respective carrier so that there is a seal between the carriers and the respective nozzle shoulders. The operation is the same as described above. Each sealing element is compressed to form a seal between the conduit and the respective sealing element and between each the nozzle and respective carrier. The fluid in the conduit flows through the conduit to one of the conduit stoppers and enters the bypass channel to follow the path shown in FIG. 10. The fluid flows through the bypass channel past the carrier, into the valve body past the collar and then into the housing. The fluid flows out of the port 45 into bypass pipe 226 into the other conduit stopper to flow down the bypass channel and into conduit 12. That portion of the conduit between the two sealing elements is effectively sealed off so that it may be removed or additional equipment or conduits added to the position. This is all accomplished without shutting off the flow of fluid through the remainder of the conduit so that there is little or no effect on the entire conduit system.

From the foregoing description, it may be appreciated that the utilization of the present conduit stoppers require cutting only two access openings in the conduit rather than four as is taught in the prior art. As was pointed out above, the described carrier 200 provides the advantage of being able to be used as an apparatus for stopping the flow in a conduit or providing a carrier having a bypass channel for use in a bypass arrangement described above. The carrier 200 provides an improved arrangement so that in the event that a situation should change in the field, the workman can make a change from one type of setup to another with a minimum of delay.

Although the present invention has been shown and described in detail in a specific embodiment in compliance with the applicable statute, it is readily apparent that those skilled in the art may make various modifications and changes in the disclosed structure without departing from the spirit and scope of the present invention. It is to be expressly understood that the instant invention is limited only by the appended claims.

What is claimed is:

1. In a conduit stopper for use with a nozzle sealingly mounted on an elongated conduit for interrupting the flow of fluid through the conduit, said conduit having an aperture communicating with the nozzle for receiving the conduit stopper, said conduit stopper including; a deformable sealing element having a pair of opposed substantially flat sides and being adapted to be forced into sealing engagement with the interior of the conduit to interrupt the flow of fluid through the conduit, a carrier sealingly connectable with the sealing element, the improvement comprising, a seal positioned between the carrier and the nozzle for selectively establishing a seal therebetween, an engagement means disposed on an interior portion of the nozzle, an actuator connected to the carrier to hold serially first the carrier in sealing communication with the nozzle with the seal therebetween and then to deform the sealing element into entire sealing engagement with the interior of the conduit to interrupt the flow of fluid through the conduit when the seal engages the engagement means, and means for limiting the force between the carrier nd the nozzle to protect the seal therebetween after the seal engages the engagement means.

2. In a conduit stopper for use with a nozzle sealingly mounted on an elongated conduit for interrupting the flow of fluid through the conduit as defined in claim 1, including a shoulder seal sealingly positioned between the carrier and the nozzle to seal flow of fluid between the carrier and the nozzle.

3. In a conduit stopper for use with a nozzle sealingly mounted on an elongated conduit for interrupting the flow of fluid through the conduit as defined in claim 1, wherein said actuator is a hydraulic cylinder having an axis aligned substantially perpendicular to the conduit.

4. In a conduit stopper for use with a nozzle sealingly mounted on an elongated conduit for interrupting the flow of fluid through the conduit as defined in claim 1, including a seal engageable with the carrier and an annular shoulder of the nozzle.

5. In a conduit stopper for use with a nozzle sealingly mounted on an elongated conduit for interrupting the flow of fluid through the conduit as defined in claim 1, including, a resilient element connected to the actuator for limiting the force between the carrier and the nozzle.

6. In a conduit stopper for use with a nozzle sealingly mounted on an elongated conduit for interrupting the flow of fluid through the conduit as defined in claim 1, wherein the carrier includes a bypass channel along an outer surface of the carrier to allow a fluid to flow out from the conduit when the sealing element is in sealing engagement with the interior of the conduit.

7. In a conduit stopper for use with a nozzle sealingly mounted on an elongated conduit for interrupting the flow of fluid through the conduit as defined in claim 1, wherein the carrier includes a bypass channel in its outer surface extending along a portion of the carrier, and including a bypass channel dam removably sealingly mounted in the bypass channel to seal off selectively the bypass channel.

8. In a conduit stopper for use with a nozzle sealingly mounted on an elongated conduit for interrupting the flow of fluid through the conduit as defined in claim 1, wherein the actuator is a hydraulic cylinder having an axis of operation substantially perpendicular to the conduit, and including a shoulder seal sealingly positioned between the carrier and the nozzle to prevent flow of fluid between the carrier and the nozzle.

9. In a conduit stopper for use with a nozzle sealingly mounted on an elongated conduit for interrupting the flow of fluid through the conduit as defined in claim 1, wherein the actuator is a hydraulic cylinder, said hydraulic cylinder having an axis of operation substantially perpendicular to the elongated conduit, a nozzle shoulder formed integral with the nozzle, a segmented seal mounted on the carrier for sealingly engagement with the nozzle shoulder, a spring mounted between the carrier and the actuator for limiting the force applied by the carrier to the nozzle, said carrier having a bypass channel on its outer surface, and a bypass channel dam removably mounted in the bypass channel selectively sealing closed the bypass channel.

10. A method for interrupting the flow of fluid through an elongated conduit including the steps of; attaching a nozzle to the exterior of the conduit, cutting into the conduit and aperture communicating with the nozzle, inserting a deformable sealing element having opposed substantially flat sides into the conduit through the aperture, positioning a carrier connected to the sealing element into the nozzle, providing an engagement means on an interior portion of the nozzle, applying an actuating force to the carrier to hold serially the carrier in sealing connection with the nozzle, limiting the force applied to the carrier for holding the carrier in sealing connection with the nozzle after the seal engages the engagement means and then applying a force to the sealing element to deform the sealing element into entire sealing engagement with the interior of the conduit to interrupt the flow of fluid through the conduit when the seal engages the engagement means.

11. A method for interrupting the flow of fluid through an elongated conduit as defined in claim 10, including the step of increasing the force applied to the sealing element without increasing materially the force applied to the carrier for holding the carrier in sealing connection with the nozzle.

12. A method for interrupting the flow of fluid through an elongated conduit as defined in claim 10, wherein the force applied to the carrier is through a resilient member to limit the application of force to the carrier without reducing the force applied to the sealing element.

* * * * *

UNITED STATES PATENT AND TRADEMARK OFFICE
CERTIFICATE OF CORRECTION

PATENT NO. : 5,186,199
DATED : February 16, 1993
INVENTOR(S) : Kevin P. Murphy and Garland Y. Smith It is certified that error appears in the above-identified patent and that said Letters Patent is hereby corrected as shown below:

Column 3, Line 64, delete "1B" and substitute therefor --18--

Column 5, Line 16, delete "10" and substitute therefor --109--

In the Claims: Column 8, Line 15, delete "nd" and substitute therefor --and--

In the Claims: Column 8, Line 21, after "including" substitute therefor --,--

Signed and Sealed this

Sixteenth Day of November, 1993

Attest:

BRUCE LEHMAN

Attesting Officer        Commissioner of Patents and Trademarks